Figure 1:
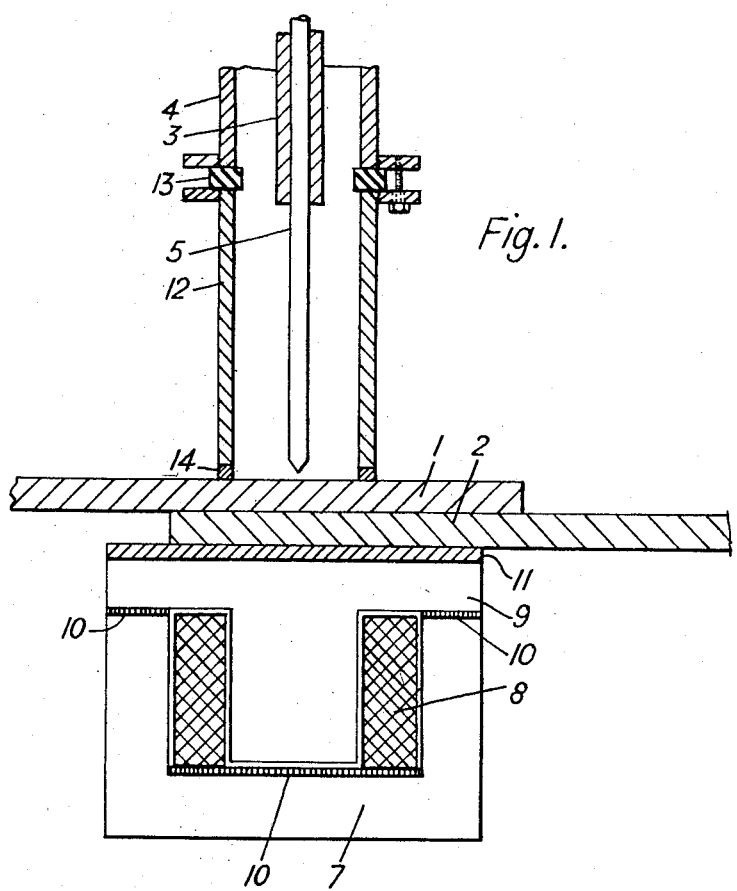

Oct. 13, 1959  R. A. CRESSWELL  2,908,801
FUSION WELDING OF METALS

Filed Jan. 28, 1957  2 Sheets-Sheet 1

Inventor
ROBERT ARTHUR CRESSWELL
By Aaron R. Townsend
Attorney

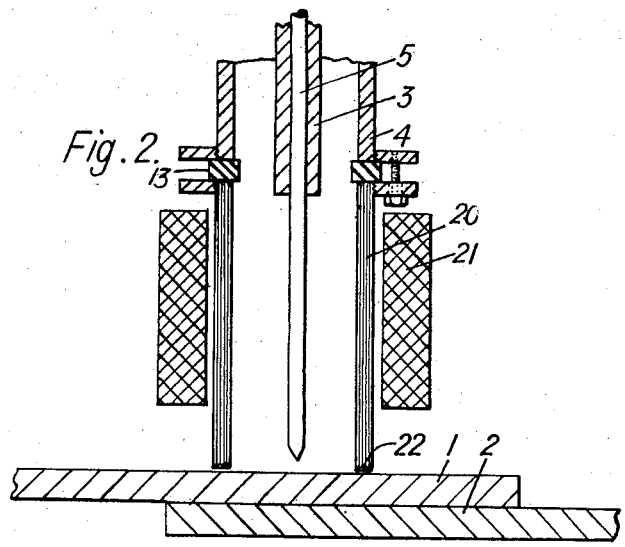
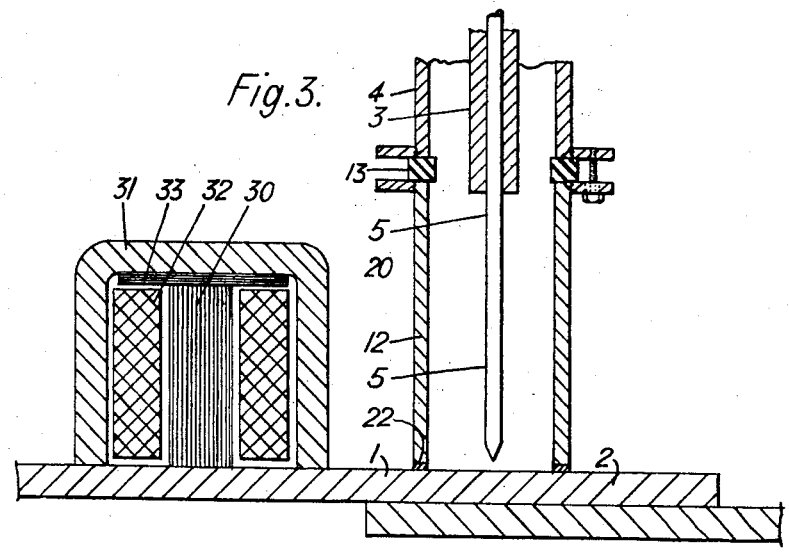

United States Patent Office 2,908,801
Patented Oct. 13, 1959

2,908,801

FUSION WELDING OF METALS

Robert Arthur Cresswell, Tadworth, Surrey, England, assignor to The British Oxygen Company Limited, a British company Application January 28, 1957, Serial No. 636,568

Claims priority, application Great Britain February 14, 1956

6 Claims. (Cl. 219—74)

This invention relates to the fusion welding of metals and more particularly to the welding of metals by means of a gas shielded electric arc.

In this latter method of welding no flux is normally used; and consequently, when this method is applied to a metal, such as aluminium, which normally possesses a refractory oxide skin, or to an alloy, such as aluminium bronze, containing such a metal as aluminium, and which will possess such a skin, it is frequently found that while the metal below the surface skin will melt during welding, the oxide skin itself is unbroken and will interfere with the formation of a satisfactory weld.

It is an object of the present invention to provide a method of gas shielded arc welding metals and alloys having a refractory oxide skin in which such interference with the formation of the weld is avoided or at least reduced.

According to the present invention, in a method of fusion welding of metals or alloys having a refractory oxide skin, by means of an electric arc shielded by a protective gas, the weld metal in the welding zone is subjected to vibrations of a frequency greater than 10 cycles per second during welding and also during the subsequent cooling of the molten weld metal. Preferably the frequency of the vibrations is between 47 and 25,000 cycles per second; but higher frequencies may be used. The amplitude of vibration required is quite low and should fall within the range 0–2 mm. It will be appreciated that as the frequency increases, it will be necessary to use a smaller amplitude on account of the increasing acceleration produced.

The effect of such vibrations is to disrupt and disperse the oxide films on the surfaces of the metals to be welded and thus to permit the formation of good welds by metal to metal fusion. In addition, the vibrations act to fragment the metal dendrites during solidification and also to assist the removal of gas from the metal; thus, an improved weld metal is produced which has a refined grain size and is less porous.

While the invention may be applied to any process of gas shielded arc welding, it is particularly useful in gas shielded arc spot welding.

Three arrangements of gas shielded arc spot welding apparatus for carrying the present invention into effect will now be described by way of example with reference to the three diagrammatic figures of the accompanying drawing in which:

Figure 1 shows a part-sectional elevation of the first apparatus, the work to be welded being vibrated by a vibrator applied to the underside of the weld area, Figure 2 shows a similar view of the second apparatus, the work to be welded being vibrated by the nozzle of a welding torch associated with a vibrator, and Figure 3 shows a similar view of the third apparatus in which the work to be welded is vibrated by a vibrator applied to the work adjacent the weld area and the welding torch.

Referring to the drawings, the work to be welded in each case consists of two overlapping plates 1 and 2 of aluminium which are to be welded together. The welding torch used in each case is of a known type in which an electrode contact tube 3 for a non-consumable electrode 5 is mounted coaxially within a tubular body 4 of the torch. A cylindrical nozzle 12 of the torch extending coaxially of the electrode 5 is adapted to contact the work to be welded as shown, and is mounted on the body 4 by way of a gasket 13 of rubber or like resilient material. The gasket 13 prevents damping of the vibrations of the work to too great an extent by the welding torch and minimises the transmission of vibrations to the handle (not shown) of the torch. The work-contacting mouth of the nozzle 12 is formed with four equally spaced notches 14 to prevent excessive gas pressure within the nozzle when pressed against the work. Alternatively holes may be formed in the walls of the nozzle adjacent the mouth for the same purpose.

In order to disrupt and disperse the oxide films on the surfaces of the plates 1 and 2, the weld metal in the weld in the weld area is arranged to be vibrated at a frequency of between 47 and 25,000 cycles per second, during the welding process and during cooling of the molten weld metal. Additionally the vibrations act to fragment the metal dendrites during solidification and also to assist removal of gas from the metal.

In the apparatus shown in Figure 1, an electromagnetic vibrator 6 is applied to the underside of the plate 2 to vibrate the weld metal in the weld area at a frequency of 50 cycles per second. The vibrator comprises a stator 7 in the form of a stack of U-type laminations bolted together and secured to a frame not shown in this figure, an electrical winding in the form of a cylindrical coil 8 mounted between the limbs of the stator, and an armature 9 in the form of a stack of T-type laminations bolted together and disposed with the upright of the T extending into the space enclosed by the coil 8. The stator 7 and armature 9 are held apart by rubber pads 10, and the armature 9 is in contact with a supporting table 10 adapted to support the plates being welded.

In practising the method of the present invention with this apparatus the nozzle 12 is pressed against the plate 1 above the overlapped portion of plate 2, the weld area is vibrated, and an electric arc is struck between the electrode 5 and the plate for a predetermined time. Shielding gas such as argon is supplied through the nozzle 12 to protect the welding arc and the weld area from atmospheric contamination until the weld metal is no longer molten, and the vibrations are continued at least until this time. Preferably the vibrations are continued with the vibrator in one position whilst a series of spot welds are produced. During welding, the plates should obviously be in contact with another at the point of welding, and in some cases it may be necessary to treat the plates in a hydraulic press to increase the conformability of the plates. Prior cleaning of the weld area by degreasing and possibly scratch-brushing may also be needed in some cases.

The apparatus shown in Figure 2 is similar in a number of respects to that shown in Figure 1 and the same reference numerals have been used where appropriate. In this apparatus however the vibrator forms part of the welding torch, the torch having a cylindrical nozzle 20 which is laminated and is surrounded by a coil 21. The mouth of this nozzle is notched at 22 to prevent excessive pressure with the nozzle. In operation of the apparatus an alternating current of a frequency of 50 cycles is supplied to the coil 21, causing the nozzle 20 to vibrate. These vibrations are transmitted to the weld metal, and act as described above to improve the weld. The method of using the apparatus will be apparent from the description given in the last paragraph.

The apparatus shown in Figure 3 is similar in a number of respects to that shown in Figure 1, and again the same reference numerals have been used where appropriate. In this apparatus the vibrator is separate from the welding torch and is applied to the upperside of the plate 1. The construction of the vibrator differs slightly from that shown in Figure 1, a laminated armature 30 being arranged to be oscillated in a vibrator frame 31 under the influence of a coil 32, and a rubber pad 33 being disposed between the armature 30 and the frame 31. In operation of this form of apparatus the vibrator is placed on the plate 1 and the coil 32 is energised to oscillate the armature 30. The vibrations of the armature 30 are transmitted through plate 1 to the weld metal during welding to improve the weld as described above. The method of using the apparatus will be apparent from the description given in connection with Figure 1.

It has been found in practice that vibrating the weld metal at a frequency of 50 cycles per second as described above greatly improves the quality of welds produced as compared with those produced by the same apparatus without the use of such vibrations. At this frequency the amplitude of vibration of the weld region should fall within the range 0–2 mm. The frequency used can however lie within the range 47 and 25,000 cycles per second. As the frequency increases it will be necessary to use a smaller amplitude on account of the increasing acceleration produced.

The vibrator may be actuated by pneumatic or other means if desired. Furthermore ultrasonic vibrations may be introduced into the plates or other work by placing a probe or ultrasonic emitter at a suitable point near the weld area, so that the sound waves have an angle of incidence such that they reach the weld area.

I claim:

1. A method of fusion welding overlapping plates of metals or alloys having a refractory oxide skin, by means of an electric arc shielded by a protective gas and established between a non-consumable electrode and the overlapping plates of metals or alloys to be welded which includes the steps of subjecting metal in the weld zone to vibrations of a frequency greater than 10 cycles per second during welding and during subsequent cooling of the molten weld metal, whereby any refractory oxide skin between the overlapping plates is disrupted and dispersed.

2. A method of fusion welding overlapping plates of metals or alloys having a refractory oxide skin, by means of an electric arc shielded by a protective gas and established between a non-consumable electrode and the overlapping plates of metals or alloys to be welded which includes the step of subjecting metal in the weld zone to vibrations of a frequency between 47 and 25,000 cycles per second produced by an electromagnetic vibrator during welding and during subsequent cooling of the molten weld metal, whereby any refractory oxide skin between the overlapping plates is disrupted and dispersed.

3. A method of welding as claimed in claim 2, in which the electromagnetic vibrator contacts at least one of the overlapping plates to be welded during welding and during subsequent cooling of the molten weld metal.

4. A method of fusion welding two workpieces formed of metals or alloys having a refractory oxide skin, which comprises overlapping the two workpieces, pressing the nozzle of an arc welding torch against one of the workpieces in the overlapped region, supplying shielding gas to shield the area of the workpiece enclosed by the nozzle, establishing an electric arc between said one of the workpieces and a non-consumable electrode supported within the nozzle to form a weld zone, and vibrating the nozzle of the torch thereby subjecting metal in the weld zone to vibrations of a frequency of more than 10 cycles per second during welding and subsequent cooling of the molten weld metal.

5. In an electric arc spot welding torch comprising a tubular body, a non-consumable electrode mounted on the body, and a shielding gas supply nozzle mounted on the tubular body surrounding the electrode and extending beyond the electrode tip, a vibration damping gasket of resilient material interposed between the shielding gas supply nozzle and the tubular body thereby minimizing the transmission to the tubular body of vibrations from a vibrated workpiece against which the shielding gas supply nozzle is pressed in use.

6. An electric arc spot welding torch comprising a tubular body, a non-consumable electrode mounted in the body, a shielding gas supply nozzle of laminated construction mounted on the tubular body surrounding the electrode and extending beyond the electrode tip, and a coil surrounding the shielding gas supply nozzle and adapted to cause the shielding gas supply nozzle to vibrate when the coil is supplied with alternating current.

References Cited in the file of this patent

UNITED STATES PATENTS

| | | |
|---|---|---|
| 1,984,809 | Re Qua | Dec. 18, 1934 |
| 2,017,003 | Hume | Oct. 8, 1935 |
| 2,571,684 | Craven | Oct. 16, 1951 |
| 2,847,556 | Brennen et al. | Aug. 12, 1958 |

FOREIGN PATENTS

| | | |
|---|---|---|
| 251,946 | Switzerland | Nov. 30, 1947 |